March 29, 1955     W. O. CUMMING     2,704,949
LAWN MOWER SHARPENER
Filed Sept. 9, 1953
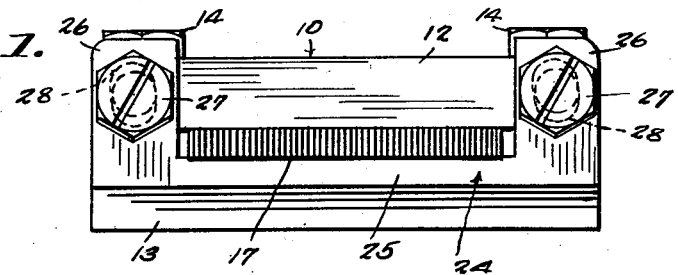
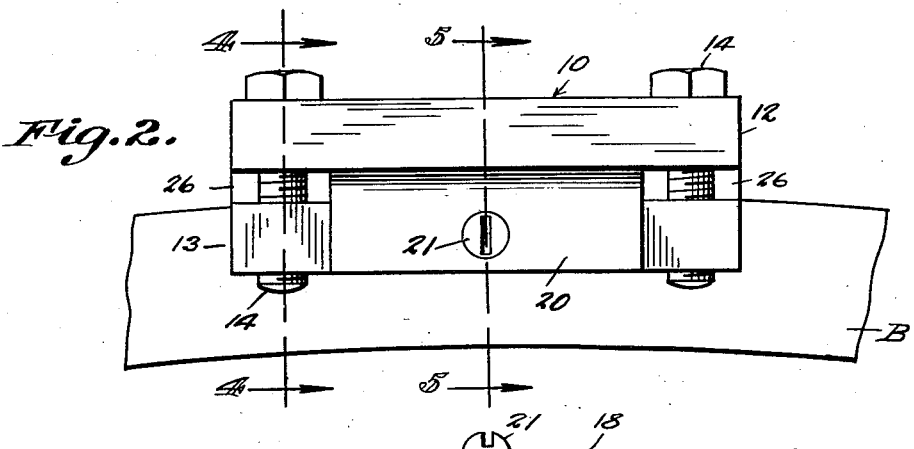
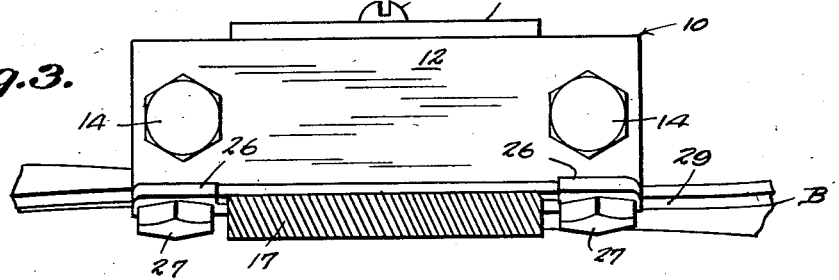
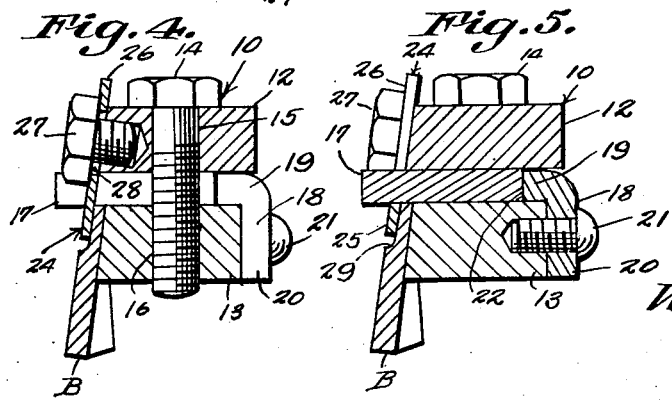
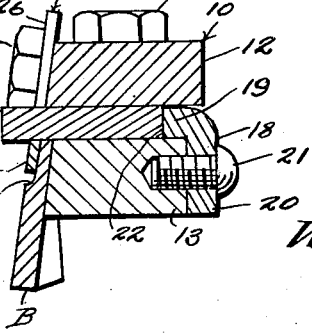
W. O. Cumming
INVENTOR
BY C. A. Snow & Co.
ATTORNEYS.

United States Patent Office 2,704,949
Patented Mar. 29, 1955

2,704,949
LAWN MOWER SHARPENER

William O. Cumming, Cordele, Ga., assignor of one-half to D. R. Cumming, New York, N. Y.

Application September 9, 1953, Serial No. 379,156

6 Claims. (Cl. 76—82.1)

This invention relates to a lawn mower sharpener.

It is a primary object of this invention to provide a novel lawn mower sharpening device slidably engageable with a lawn mower cutting blade and manually slidable along the length of the blade during the sharpening operation.

It is another object of this invention to provide a clamping means for a file and a guide means on the clamping means through which a lawn mower cutting blade to be sharpened is freely slidable while the file is in filing engagement with the cutting edge of the lawn mower blade to be sharpened.

A further object of this invention is to provide a lawn mower cutting blade sharpening device of the kind to be more particularly described hereinafter which is readily constructed and assembled and is handy to be operated throughout the length of a curved lawn mower cutting blade and adjustable to fit snugly on the blade.

Other and further objects and advantages of the invention will be hereinafter described and the novel features thereof defined in the appended claims.

In the drawings:

Fig. 1 is a side elevation of the sharpening device constructed according to an embodiment of my invention.

Fig. 2 is a side elevation of the side opposite to Fig. 1 with the lawn mower blade applied in position.

Fig. 3 is a top plan view, partly broken away.

Fig. 4 is a transverse section taken on the line 4—4 of Fig. 2.

Fig. 5 is a transverse section taken on the line 5—5 of Fig. 2.

In the use of a lawn mower having a plurality of cutting blades thereon, as on a cutting reel, it is desirable to sharpen the cutting blades in the field without removing the lawn mower cutting reel and the lawn mower cutting blade sharpening device of this invention is particularly applicable for sharpening the cutting blades of a lawn mower cutting reel on the lawn mower without removing the lawn mower cutting reel from the mower.

The lawn mower cutting blade sharpening device formed according to an embodiment of my invention is designated by the numeral 10 in the drawings to be applied to the opposite sides of a lawn mower blade B. The blade sharpening device 10 is provided with a clamping block 12 which is adapted to be engaged on one edge of the lawn mower blade B and a clamping block 13 which is to be connected to the clamping block 12 for sliding movement of the device along the length of the cutting blade B. The lower clamping block 13 is adapted to be clampingly engaged on the upper clamping block 12 by means of bolts 14 which are threadedly engaged in the lower clamping block 13 and slidably engaged through drilled openings 15 in the upper clamping block. Each of the bolts 14 is rotatably engaged in the drilled openings 15 and threadedly engaged in the threaded opening 16 so that upon rotation of the bolts 14 the lower clamping block will be moved and held in clamping engagement with the upper clamping block.

A sharpening file 17 is clampingly supported between the clamping blocks 12 and 13 of the lawn mower blade sharpening device 10 as clearly shown in the drawings. The file 17 and a file stop 18 are secured between the clamping blocks 12 and 13 and the clamping blocks 12 and 13 together with the file are slidable along the length of the cutting blade C.

The file stop 18 is L-shaped in configuration having a horizontal arm 19 and a depending arm 20 at one end of the horizontal arm 19 as clearly shown in Figs. 4 and 5 of the drawings. A screw 21 is engaged through the depending horizontal arm 19 and into the lower clamping block 13 for securing the file stop 18 in its proper position on the sharpening device 10. The horizontally extending arm 20 of the file stop 18 is positioned between the clamping blocks 12 and 13 together with the file 18 to limit the movement of the file within the device 10.

One end 22 of the file stop 17 is adapted to engage one side edge of the file 17 so that the file 17 may be moved laterally into the device 10 whereby a proper positioning of the file 17 in the device is maintained despite the wear on the teeth of the file 17 resulting from the filing of the teeth.

The main portion of the file 18 extends laterally of the sharpening device 10 so that the other edge of the file 17 may engage the end 22 of the file stop 17 while the file 17 is supported in its proper position during the filing operation of the device 10.

The file clamping support 24 is U-shaped in configuration and supported on the upper clamping block 12 for vertical movement transversely of the blocks 12 and 13 engaging in supporting position below the lower surface of the file 17. The file support is provided with a horizontal supporting bar 25 which engages below the file 17 in supporting position and vertically extending arms 26 at the opposite ends of the horizontal arm 25 which are connected to the upper clamping block 12 by bolts 27. The bolts 27 rotatably engage through elongated openings 28 adjacent the upper end of the upper end of each of the arms 26 and are threadably engaged in the clamping block 12. The slots 28 for the bolts 27 provides for the adjustable movement of the file support 24 with the horizontal arm 25 in flush supporting engagement below the file 17.

In the case of a lawn mower cutting blade B having a recess 29 on one side of the cutting blade, the support 24 is adapted to slidably engage in the recess 29 and one side of the clamping block 13, opposite from the support 24 engages the other side of the lawn mower blade B whereupon the file 17 engages the edge of the cutting blade B transversely thereof and the file 17 may be positioned to properly sharpen the cutting edge between the sides of the cutting blade B.

In the use and operation of the lawn mower cutting blade sharpening device 10, a file 17 is engaged between the clamping blocks 12 and 13 and a lawn mower cutting blade B is slidably engaged between the lowermost of the clamping blocks 13 and the uppermost clamping block 12 in direct engagement with the stop 18. The file support 24 also provides a guide for the lawn mower cutting blade B as the arms 26 of the support are rigidly secured to the uppermost clamping block 12 and the horizontal arms 25 is spaced away from the sides of the lowermost clamping block 13 so that the lawn mower blade to be sharpened is slidably engaged between the support 24 and the clamping block 13 on opposite sides of the blade B. In this position the file 17 is maintained transversely of the blade B in sharpening engagement with the edge of the cutting blade B between the opposite sides thereof.

While the specific details of one embodiment of this invention have been herein shown and described, the invention is not confined thereto as changes and alterations may be made without departing from the spirit and scope thereof as defined in the appended claims.

I claim:

1. A lawn mower cutting blade sharpening device comprising a block slidably engageable with one side of a lawn mower cutting blade to be sharpened, a second block overlying said first block, bolts rotatable on said second block and threadedly engaged in said first block, a flat lawn mower cutting blade sharpening file flatly clamped between said blocks and engageable with the blade cutting edge between the sides of the blocks, a file stop on one of said blocks engaging between said blocks and engageable with an edge of said file, a file support and guide on the outer side of one of said blocks supportingly engageable with a side of said file, said file support and guide being slidably engageable on the other side of the lawn mower cutting blade whereby said file may be slidably moved along the length of the lawn mower cutting blade with the file in sharpening engagement with the cutting edge of the lawn mower cutting blade.

2. A lawn mower cutting blade sharpening device comprising a clamping block, a second clamping block, screw threaded means securing said blocks together, a file clampingly engaged between said blocks transversely thereof, a guide plate carried by one of said blocks overlying the other of said blocks in spaced relation thereto to said other block comprising a channel between said other block and said plate for slidably receiving a lawn mower cutting blade to be sharpened.

3. A lawn mower cutting blade sharpening device comprising a pair of clamping blocks secured together in overlying clamping relation to each other, a flat file clampingly engaged between said blocks, one edge of said file extending outwardly from between said clamping blocks, a file stop carried by one of said blocks and engaging the other edge of said file, a cutting blade guide plate secured to one of said blocks and spaced from the other of said blocks whereby a lawn mower cutting blade may be slidably engaged between said guide plate and said other of said blocks and said file in positioned perpendicular to said cutting blade for sharpening engagement with the cutting edge of said lawn mower cutting blade.

4. A lawn mower cutting blade sharpening device comprising a clamping block, a second clamping block overlying said first mentioned block, bolts engaging said blocks for clamping said blocks together, a cutting blade guide plate secured to the uppermost of said blocks and spaced from the lowermost of said blocks for slidably engaging the sides of a lawn mower cutting blade between said guide plate and the lowermost of said guide blocks, a lawn mower cutting blade sharpening file clampingly engaged between said clamping blocks transversely thereof for sharpening engagement with the cutting edge of the cutting blade substantially perpendicular to the sides of the cutting blade whereby the cutting edge of the lawn mower blade is sharpened upon sliding movement of said device longitudinally of said lawn mower blade.

5. A lawn mower cutting blade sharpening device as set forth in claim 4 including a file stop on one of said clamping blocks engaging one edge of said file.

6. A lawn mower cutting device as set forth in claim 4 wherein said guide plate is formed with a longitudinal slot adjacent each edge thereof and a bolt engaging through each of said slots threadedly engaging with said other of said clamping blocks.

References Cited in the file of this patent

UNITED STATES PATENTS

| | | |
|---|---|---|
| 463,676 | Bachelder | Nov. 24, 1891 |
| 1,090,075 | Knowlton | Mar. 10, 1941 |
| 1,738,005 | Holm | Dec. 3, 1929 |
| 2,371,492 | Wulff | Mar. 13, 1945 |